United States Patent [19]
Petty et al.

[11] 3,940,640
[45] Feb. 24, 1976

[54] MHD GENERATOR WITH UNIFORM CURRENT DISTRIBUTION

[75] Inventors: Stanley W. Petty, Boxford; Richard J. Rosa, Cambridge, both of Mass.; George R. Enos, Concord, N.H.

[73] Assignee: Avco Everett Research Laboratory, Inc., Everett, Mass.

[22] Filed: Feb. 15, 1974

[21] Appl. No.: 442,802

[52] U.S. Cl. ............................................. 310/11
[51] Int. Cl. .......................................... H02n 4/02
[58] Field of Search ........................... 310/11; 322/7

[56] References Cited
UNITED STATES PATENTS

| | | | |
|---|---|---|---|
| 3,149,247 | 9/1964 | Cobine et al. | 310/11 |
| 3,183,380 | 5/1965 | Hurwitz, Jr. et al. | 310/11 |
| 3,324,318 | 6/1967 | Kantrovitz et al. | 310/11 |
| 3,524,086 | 8/1970 | Lindley | 310/11 |
| 3,792,340 | 2/1974 | Sheinkman et al. | 310/11 X |

Primary Examiner—Donovan F. Duggan
Attorney, Agent, or Firm—Charles M. Hogan; Melvin E. Frederick

[57] ABSTRACT

An MHD generator includes external electrical connectors between pairs of the discrete electrodes in opposite walls of the generator duct, which may lie in a plane at an angle to the direction of gas flow. The electrical connection includes a passive or an active circuit which controls current flow between the connected electrodes to insure that uniform current flow along the length of the duct and that excessive current flow through such discrete electrodes in opposite walls of the duct do not exceed a damaging limit which may otherwise occur. Indicator means when coupled to the circuits in accordance with the invention comprise diagnostic means which provide a graphic representation of current distribution along the length of the generator duct.

8 Claims, 5 Drawing Figures

MHD GENERATOR WITH UNIFORM CURRENT DISTRIBUTION

BACKGROUND OF THE INVENTION

The present invention relates to magnetohydrodynamic (hereinafter abbreviated "MHD") generators, and more particularly to such generators that employ either the Hall or diagonal method of connection.

In general terms, MHD generators produce electric power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source.

Several different gases may be used, for example, the gas may simply be air, or may comprise inert gases, such as helium or argon. To promote electrical conductivity, the gases are heated to high temperature and may be seeded with a substance that ionizes readily at the operating temperature of the generator. For seeding purposes, sodium, potassium, cesium or an alkali metal vapor may be used. Regardless of the gas used and the manner of seeding, the resulting gases comprise a mixture of electrons, positive ions and neutral atoms which, for convenience, may be termed "plasma."

In the conventional MHD generator, the plasma flows through a magnetic field, which is directed perpendicular to the direction of plasma flow. The movement of the electrically conductive plasma relative to the field produces an E.M.F. that is normal both to the direction of flow of the plasma and the magnetic field, the current flowing transversely of the field between opposed electrodes at the sides of the generator. In such a generator, a separation of positive and negative electrical charges occurs along the length of the plasma stream, producing a potential gradient, known as the "Hall potential", which promotes longitudinal circulation of current internally of the generator. In a conventional MHD generator, such longitudinal currents cause energy losses which are detrimental to the operation of the generator and various schemes have been devised to prevent their formation. It is possible, however, to build an MHD generator that takes advantage of the Hall potential, as in the so-called "Hall current generator" and the so-called "diagonal generator".

The Hall current generator comprises a duct and a magnetic field normal to the axis of the duct. Movement of plasma through the duct and the field induces an electromotive force between numerous pairs of opposed discrete electrodes that are interconnected to accommodate circulation of current transversely of both the magnetic field and the direction of plasma flow. The terminal electrodes, i.e., the first and last electrodes along the length of the duct, are connected to an external load, making possible circulation of Hall current longitudinally through the plasma and the load circuit. Oppositely disposed electrodes intermediate the terminal electrodes are interconnected to provide the aforementioned transverse circulation of current. The arrangement of elements is quite simple and effective.

The diagonally connected generator is somewhat more complex, but more efficient than the Hall generator. Its operation may be explained as follows: Movement of the electrically conductive plasma past each pair of opposed discrete electrodes generates a potential gradient in the plasma therebetween. Assuming that the velocity of the plasma and the magnetic field strength are constant the length of the duct, then the potential difference established transverse of the duct between any given pair of opposed electrodes is substantially constant; however, because of the Hall potential existing longitudinally of the duct, the mean potential of the last pair of electrodes is at a more positive level than that of the first pair of electrodes. Thus, the mean potential of any given pair of opposed electrodes is more positive than the mean potential of opposed electrodes that are upstream thereof.

By suitable spacing of the electrodes along the duct, it is possible, under ideal circumstances to make the potential of staggered, opposed electrodes the same. Since these electrodes are at the same potential, they may be electrically interconnected. A structure such as this with the diagonally opposed electrodes interconnected is described in U.S. Pat. No. 3,148,291, which issued Sept. 8, 1964. In this structure, it will be noted that the power generated by each pair of opposed electrodes is added to the power of all other pairs of electrodes and supplied to the terminal electrodes. Thus, a generator of the type described not only is able to deliver power at high voltage, but substantial amounts of power to a common load.

One problem that arises with the Hall generator and also the "diagonally connected MHD generator" is that there is a tendency for the current flowing in the gas to flow preferentially to some electrodes and not to others due, for example, to random variations in their surface properties or structure. This can lead to concentrations of Hall voltage between certain electrodes and lead to damaging breakdown—especially on the anode wall.

SUMMARY OF THE INVENTION

In view of the foregoing, it will be apparent that a broad object of the invention is to provide an improved MHD generator of the Hall or diagonal type.

Another object is to provide an MHD generator of the Hall or diagonal type having intermediate the terminal electrodes, opposed electrodes that are so interconnected in pairs such that there is a tendency toward uniform distribution of the transverse current and Hall voltage along the generator duct.

Still another object of the invention is the provision of an MHD generator of the Hall or diagonal current type that is capable of producing electric power at high voltage with great efficiency.

Still another object of the invention is to provide an MHD generator having opposed sets of electrodes that are interconnected in such fashion that the output from the generator represents the aggregate output of the individual sets of electrodes.

Still another object of the invention is the provision of an MHD generator of the Hall or a diagonal current type having means to control the current between interconnected opposed electrodes to insure that the current flow through such electrodes does not reach a damaging limit and which may provide a graphic representation of current distribution along the length of the duct for diagnostic purposes and the like.

Other objects of the invention are to provide a generator characterized by: A moving stream of electrically conductive gas in a duct having an inlet and an outlet, a magnetic field normal to the direction of gas flow, terminal electrodes in the duct at the inlet and outlet, a plurality of discrete electrodes at intervals along opposing walls of the duct, pairs of said opposing electrodes lying in planes which are generally parallel and at an angle $\theta$ to the direction of the gas stream and means in circuit with such pairs of opposing electrodes to provide sufficient control of current flowing therethrough to insure that such current flow does not exceed a damaging limit.

In one embodiment of the present invention, a passive dc resistor is coupled between the electrodes of a diagonally opposing pair. The value of this resistance is such that only a few percent of the power flow from the electrode pair is lost in the resistor. In another embodiment, an active circuit element such as an SCR or a transistor is used to control the current flow.

In a further embodiment, the impedances coupled between the electrodes may be such as to provide an indication of current flow in the electrodes and/or utilized to actuate indicator means providing a graphic representation of current distribution along the length of the duct.

Other objects and features of the present invention are understood from the description herein of the specific embodiments which represent the best known uses of the invention. These embodiments are described herein in conjunction with the following figures:

DESCRIPTION OF EMBODIMENTS OF THE INVENTION

In an MHD generator the gas moving through the generator duct is a slightly ionized plasma having a substantially equal number of positive ions and electrons. Since the electrons are very much lighter than the ions, they have far greater mobility in an electron field and carry the great majority of the current. The current flow between opposed electrodes is thus due almost entirely to electron flow. The drift velocity of the electrons is given by the following equation:

$$V_e = \frac{j}{N_e e} \qquad (1)$$

where:
$j$ = current density
$N_e$ = electron density
$e$ = electron charge

It should be noted, however, that the drift velocity of the electrons is perpendicular to the magnetic field B. This causes an electric field (known as the "Hall field" $E_H$) to be induced along the length of the duct. This field may be calculated from the following equation:

$$E_H = V_e B = \frac{j}{N_e e} = \omega \tau V B (1-\alpha) \qquad (2)$$

where:
$\omega$ = electron cyclotron velocity
$\tau$ = mean electron collision time
$\alpha$ = E/VB (non-dimensional)
$E$ = electric field between electrodes Directing attention now to FIG. 1, the gas velocity is again designated V and the magnetic field is designated B. The V×B potential gradient is induced as a result of the gas movement through the field. This results in an electric field E between the directly opposed electrodes. However, the Hall field $E_H$ is directed along the axis of the gas stream in a direction opposite to its movement. The resulting electric field E is thus directed at an angle to the direction of movement of the gas stream.

For gases of practical interest for use in MHD generators, the Hall field can be quite large, equal sometimes to two to three times the size of V×B.

The MHD generator described in U.S. Pat. No. 3,148,291 includes a tapered duct. Along the top and bottom of the duct are provided pluralities of discrete electrodes. Adjacent the entrance and exit of the duct are opposed pairs of terminal electrodes which are connected by conductors to a load. Furthermore, diagonally opposed electrodes are electrically interconnected such that the ends of each interconnected pair of electrodes lie within a plane at an angle $\theta$ to the stream of plasma flowing through the duct. The angular position of these planes and the angular positions of the terminal electrodes are the same. Ideally, the Hall voltage at two of the diagonally opposed electrodes is the same and so the direct interconnection is possible.

Figure 1:
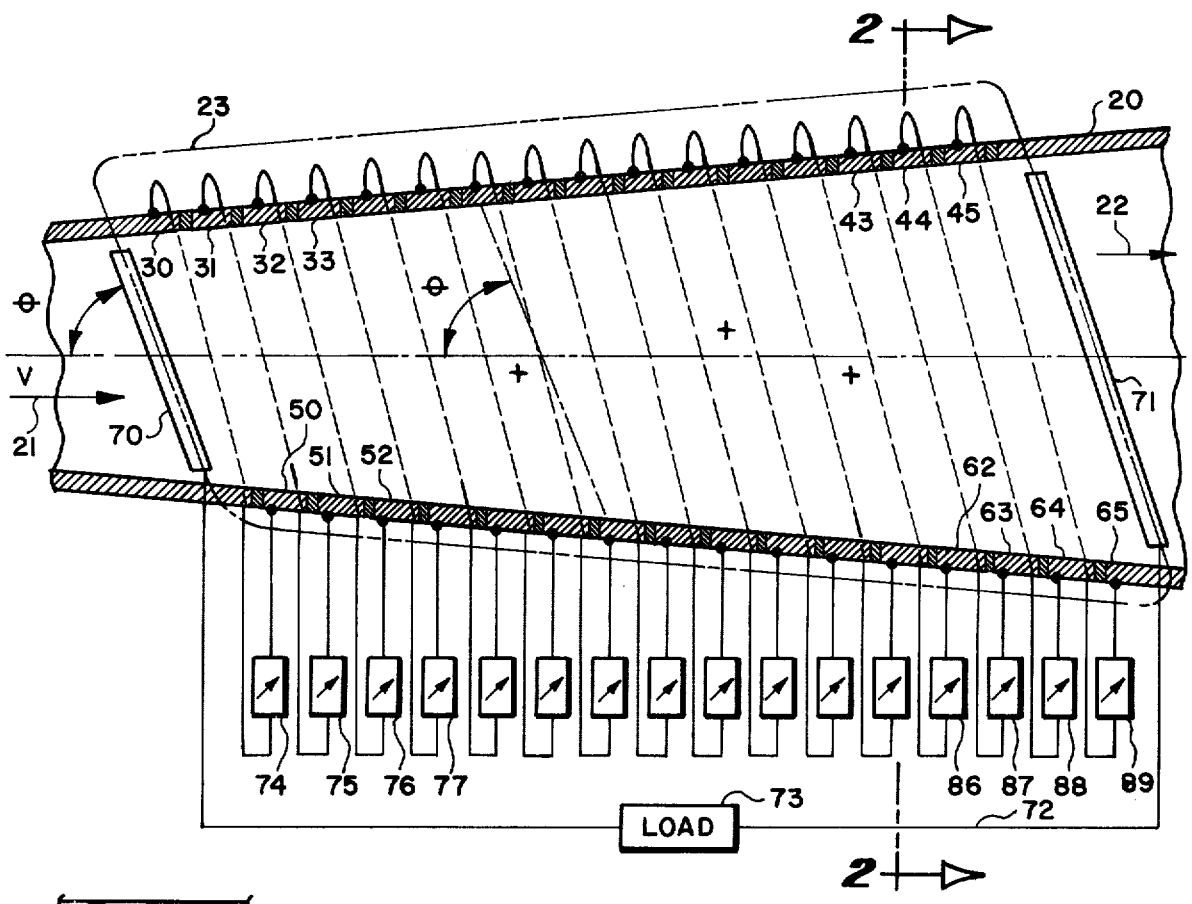
FIG. 1 is a schematic longitudinal sectional view of an MHD diagonally connected generator embodying one of the novel principles of this invention.

Directing attention to FIG. 1, it will be noted that the generator comprises a duct, generally designated 20 to which high temperature, high pressure, electrically conductive plasma is introduced, as indicated by arrow 21, and from which it exhausts as indicated by the arrow 22. Adjacent the exterior of the duct is a continuous electrical conductor in the form of a coil 23 to which current may be supplied from any conventional source or from the generator itself. Flow of current in the coil provides a magnetic flux through the duct perpendicular to the plane of the paper.

Along the top and bottom of the duct are provided pluralities of discrete electrodes 30–45 and 50–65, respectively. Adjacent the entrance and exit of the duct are opposed pairs of terminal electrodes, one of each pair being shown at 70 and 71, respectively. These terminal electrodes are connected by conductor 72 to a load 73.

Diagonally opposed electrodes are electrically interconnected by impedances. For example, upper electrode 30 is electrically connected by impedance 74 to lower electrode 50. Similarly, corresponding diagonally opposed discrete electrodes 31 and 51, 32 and 52, etc. are interconnected by adjustable impedances 75 to 89.

Each such an interconnected pair of electrodes lie within a plane at the angle θ to the stream of plasma flowing through the duct. The angular position of these planes and the angular positions of the terminal electrodes 70 and 71 are discussed fully in U.S. Pat. No. 3,148,291 and U.S. Pat. No. 3,324,318.

It is to be noted that whereas in the diagonally connected generator, the interconnected electrodes lie in planes at an angle θ as illustrated in FIG. 1, of less than 90°, in the Hall generator the circulation of current in the duct is transverse to the duct axis (transverse to both the magnetic field and direction of plasma flow) and is made so by interconnecting directly opposed electrodes. Thus, in the special case of the Hall generator, the angle θ is 90°, whereas otherwise it is less than 90°.

Figure 2:
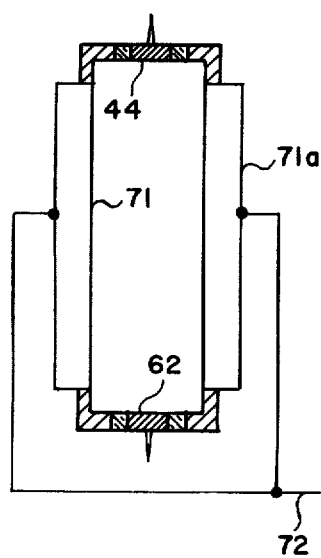
FIG. 2 is a cross sectional view of the generator shown in FIG. 1 taken on plane 2—2 of FIG. 1.

As shown in FIG. 2, the duct may be generally rectangular in cross section and the terminal electrode 71 is electrically interconnected with its opposed terminal electrode 71a in the opposite wall of the duct. As is the case with the electrodes 30–45 and 50–65, all of the terminal electrodes are electrically insulated from the duct.

Because of the Hall potential existing longitudinally of the duct, electrons from the plasma stream will enter terminal electrode 70 and its opposed terminal electrode (not illustrated), flow through the load circuit to the terminal electrodes 71 and 71a, and re-enter the plasma stream from these latter electrodes. Because of this electron movement, the upstream terminal electrodes may be regarded as anodes, and the downstream terminal electrodes as cathodes. The discrete electrodes 50–65 serve as anodes and electrodes 30–45 as cathodes. With regard to the discrete electrodes, electrons will be emitted by the electrodes (cathodes) 30–45 and will be received from the gas stream by electrodes (anodes) 50–65. Consistent with the foregoing designations, the magnetic field should be established perpendicular to the direction of plasma flow and perpendicularly into the plane of the paper. The magnetic field is designated in FIG. 1 by the plus signs, indicating flux lines directed into the plane of the paper.

Movement of electrically conductive plasma past each pair of directly opposed electrodes generates a potential gradient in the plasma therebetween which is proportional to the cross product of the velocity of the gas and the magnetic field strength. Under the influence of this potential, an electron current flows between the electrodes.

If it could be assumed that the velocity of the plasma and magnetic field strength are constant throughout the length of the duct and that there is no tendency for the current flowing in the gas to flow preferentially to some electrodes and not to others due to random variations in their surface properties or structure, then the potential difference established transverse of the duct between any given pair or opposed electrodes would be substantially constant. Furthermore, because of the Hall potential existing longitudinally of the duct, the mean potential of the last pair of electrodes is at a more positive level than that of the first pair of electrodes. Thus, the mean potential of any given pair of opposed electrodes is more positive than the mean potential of opposed electrodes that are upstream thereof.

Figure 3:
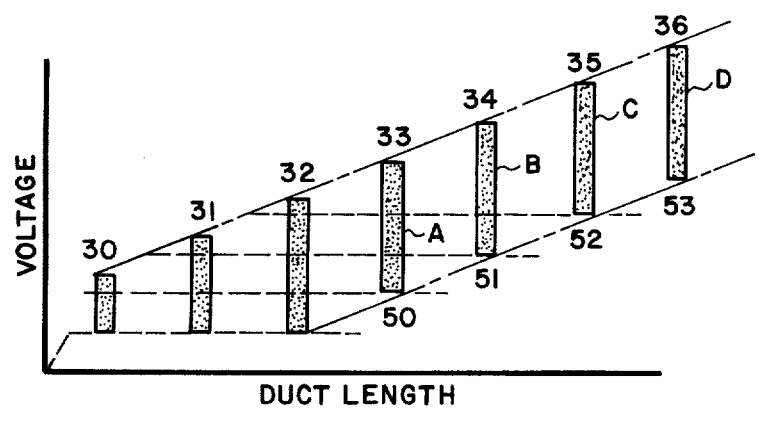
FIG. 3 is a graph illustrating ideal and typical actual voltage conditions within the generator.

This is illustrated by FIG. 3 which shows in graphical form the potential difference in the plasma stream existing between successive pairs of opposed electrodes in this ideal case. The bar graph A shows the potential difference between electrodes 33 and 50, the potential associated with the electrodes being indicated by the reference numbers of the electrodes at the ends of the bar graph. Similarly, with respect to bar graphs B-D which illustrate the potential difference between opposed electrodes 34–51, 35–52 and 36–53.

By suitable spacing of the electrodes along the duct, it is possible to make the potential of the staggered, opposed electrodes the same in this ideal case and so the diagonally opposed electrodes can be directly connected to each other as in U.S. Pat. No. 3,148,291. However, in a typical MHD Hall generator or diagonally connected generator, there is a tendency for the current flowing in the gas to flow preferentially to some electrodes and not to others due to various factors such as random variations in their surface properties or structure. This concentration of current leads to damaging breakdown especially on the anode wall. A solution to this problem, in accordance with one embodiment of the present invention is to put an impedance such as 74 in series with each electrode. The size of this impedance is such that the rated current through it produces a voltage drop comparable to the rated Hall voltage per electrode. The power lost in the impedance need not be large, the fraction being approximately the Hall voltage per electrode $\div \mu$ BD. Here, D is the distance from center to center between adjacent discrete electrodes in the wall of the duct, $\mu$ is the macroscopic plasma velocity and B is the magnetic field strength. In a typical case where, for example, the Hall voltage per electrode is 40 volts, $\mu$ is 2,000 meters per second, B is 3.0 webers/meter$^2$ and D is 0.2 meters, this fraction is only 0.033 or 3.3% of the Hall voltage per electrode. Generally, the larger the generator, the smaller this fraction becomes.

The impedances such as 74 connecting the diagonally opposed electrodes as shown in FIG. 1 may be dc resistors of predetermined values. Each of these resistors may be adjusted during a test under operating conditions to provide the desired voltage differential between adjacent discrete electrodes. For this purpose, these resistors are shown in FIG. 1 as variable resistors.

Figure 4:
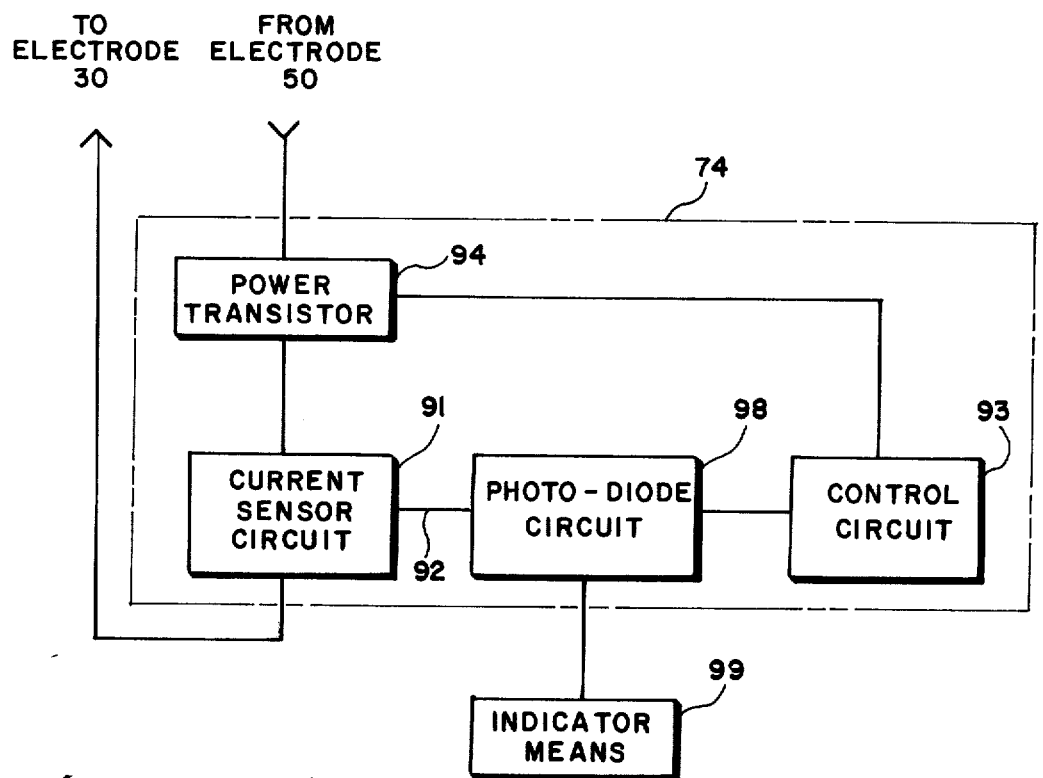
FIG. 4 is an electrical block diagram showing a nonpassive electrical interconnection between diagonally opposing electrodes to control the current to each electrode.

As an alternate structure, the impedances 74 to 89 may each be an active circuit such as shown in FIG. 4. This active circuit between diagonally opposed discrete electrodes produces a voltage drop sufficient to limit the current to each electrode to a predetermined value, i.e., it acts as a current limiter. So long as the current is normal, the voltage drop of the current is small and, hence, so is the power dissipated. In this respect, it is superior to the simple resistor.

The active circuit shown in FIG. 4 includes a current sensor 91 in the connecting line between diagonally opposed electrodes. The output of sensor 91 in lines 92 is a signal representative of the current between the connected electrodes. This signal is applied to the input of control circuit 93 which controls the gain of power transistor 94 in series with the sensor 91. High voltage isolation means 98 such as, for example, photodiode optoisolator Model MCD-1 manufactured by Monsanto Commercial Products of Cupertino, Calif. may be provided intermediate current sensor circuit 91 and control circuit 93 to provide a signal proportional to the current flowing in line 92 and, hence the current flowing between electrodes 30 and 50. Isolation means 98 provides an output signal to indicator means 99 which provides an indication of the magnitude of current flow between electrodes 30 and 50.

Whereas in accordance with the embodiment illustrated in FIG. 4, signals are derived and utilized to provide an indication to a plant operator or the like of current distribution, the impedance 74, for example, may for some applications comprise a lamp located on a display panel. Thus, with such lamps or the like arranged sequentially on a display panel, such series connected lamps may, in addition to controlling electrode current, provide a plant operator with a graphic picture of the current distribution throughout the length of the generator duct.

In either the above cases, irregularity in the distribution of luminosity will alert the operator to the existence of trouble and/or give him a quick insight into potential trouble spots.

Figure 5:
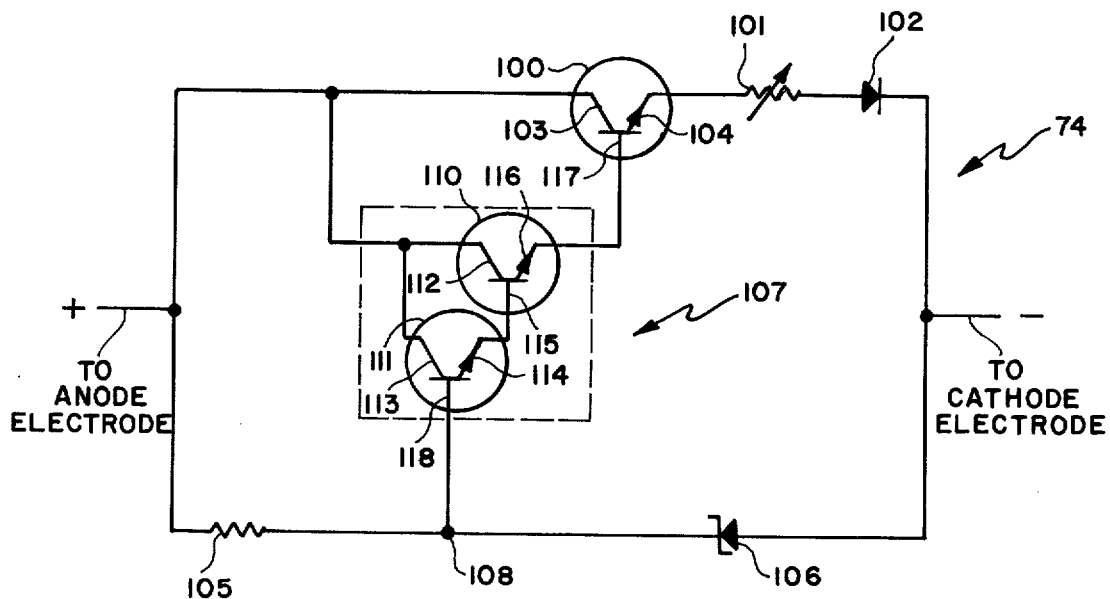
FIG. 5 is an electrical circuit diagram showing details of an active circuit connected between diagonally opposing electrodes.

Directing attention now to FIG. 5, there is shown details of an active circuit similar to that of FIG. 4. An active circuit as shown in FIG. 5 comprises a power transistor 100 connected in series with a variable sensing resistor 101 and a blocking diode 102. The collector electrode 103 of the power transistor 100 is connected to an anode electrode (electrode 50, for example), the emitter electrode 104 is connected to sensing resistor 101 which, in turn, is connected to a cathode electrode (electrode 30, for example), through the blocking diode 102. A second resistor 105 is connected between the anode electrode and diode 106, diode 106 being connected to the cathode electrode. A control circuit designated generally by the numeral 107 is coupled between the collector and base electrode of the power transistor 100 and a point 108 intermediate resistor 105 and diode 106 to provide rapid turn-on of the power transistor at low current levels. The control circuit 107 may comprise, as shown by way of example in FIG. 5, a pair of transistors 110 and 111 having their collector electrodes 112 and 113 interconnected and connected to the collector electrode 103 of the power transistor. The emitter electrode 114 of transistor 111 is connected to the base electrode 115 of transistor 110, the emitter electrode 116 of which is connected to the base electrode 117 of the power transistor 100. The base electrode 118 of transistor 111 is connected intermediate to point 108, resistor 105 and diode 106.

The current flowing from the anode electrode to the cathode electrode can be controlled by the circuit shown in FIG. 5. The current passing through the power transistor 100 via its collector and emitter electrodes is controlled by the values of or the value selected for the sensing resistor 101 in combination with the blocking diode 102. The power transistor 100 permits the flow of current until it reaches a predetermined maximum. When this maximum current is reached, the voltage drop across the sensing resistor 101 is approximately equal to the voltage across the zener diode 106, thereby causing the power transistor 100 to prohibit any further increase in the current flowing through it. The control circuit 107 permits the rapid turn-on of the power transistor 100 at low current levels and the blocking diode 102 prevents damage to the power transistor 100 should a reverse voltage develop between the anode and cathode electrodes.

The embodiments of the present invention representing the best known uses of the invention all serve to control the current to each electrode and/or the voltage between adjacent discrete electrodes in the duct wall of an MHD type Hall or diagonal generator. Even while following the teachings of this invention, variations and modifications will occur to those skilled in the art without departing from the spirit and scope of the invention as set forth in the following claims:

What is claimed is:

1. An MHD generator for generating electricity from a moving stream of electrically conductive gas comprising,
   a duct for conveying the gas stream, the duct having an inlet and an outlet,
   means for establishing a magnetic field through said duct normal to the direction of gas flow,
   terminal electrodes positioned along the duct at the inlet and outlet,
   a plurality of discrete electrodes positioned at intervals along opposing walls of the duct,
   certain of said discrete electrodes being directly opposed and lying in planes normal to the direction of gas flow, said generator having a rated Hall voltage between adjacent electrodes,
   a plurality of coupling means each coupling together different opposed discrete electrodes which lie in planes at an angle $\theta$ to the direction of gas flow, said coupling means including a power transistor and current sensor in series between the opposing electrodes in a plane at said angle $\theta$,
   said coupling means producing a voltage drop between said connected discrete electrodes in the plane at angle $\theta$ sufficient to prevent current flow in said opposed electrodes from exceeding a damaging limit.

2. An MHD generator as in claim 1 wherein,
   a control circuit is included for controlling gain of the transistor in response to the output of the current sensor.

3. An MHD generator as in claim 1 wherein,
   the coupling means includes a first series circuit connected between said opposing electrodes comprising a power transistor in series with a sensing resistor and a blocking diode in series with said sensing resistor,
   a second series circuit connected between said opposing electrodes comprising a resistor and a diode; and
   a control circuit coupled between said power transistor and a point intermediate said second circuit resistor and diode for effecting rapid turn-on of said power transistor at low current levels, said first circuit sensing resistor and said second circuit diode controlling said power transistor for determining the maximum current level that can flow through said power transistor, and said first circuit blocking diode protecting said power transistor from a reversal of voltage across it.

4. An MHD generator as in claim 1 wherein,
   an external electrical load is coupled between said terminal electrodes, and
   each discrete electrode is electrically coupled to the opposing discrete electrode which lies in a plane therewith at an angle $\theta$ to the direction of gas flow.

5. An MHD generator as in claim 1 wherein,
   said terminal electrodes each includes opposing electrode structures at the inlet and the outlet, the opposing electrode structures of each lying in a plane at said angle $\theta$ to the direction of gas flow.

6. An MHD generator as in claim 5 wherein,
   the magnetic field is concentrated in the region between said terminal electrodes.

7. An MHD generator as in claim 1 and additionally including,
   means for providing a signal proportional to current flow through said coupling means, and
   indicator means actuated by said signal for providing an indication proportional to current flow.

8. An MHD generator as in claim 1 and additionally including,
   means for providing a signal proportional to each said voltage drop produced by each said coupling means, and
   indicator means actuated by said signal for providing an indication proportional to said voltage drops.

* * * * *